J. E. NORQUEST.
CIGAR AND CHEROOT TRIMMING MECHANISM.
APPLICATION FILED JULY 23, 1917.

1,252,933.

Patented Jan. 8, 1918.

Inventor
John E. Norquest

Witness

By
Attorneys

UNITED STATES PATENT OFFICE.

JOHN E. NORQUEST, OF RICHMOND, VIRGINIA, ASSIGNOR TO P. LORILLARD COMPANY, OF NEW YORK, N. Y., A CORPORATION OF NEW JERSEY.

CIGAR AND CHEROOT TRIMMING MECHANISM.

1,252,933.

Specification of Letters Patent.   Patented Jan. 8, 1918.

Application filed July 23, 1917.   Serial No. 182,284.

*To all whom it may concern:*

Be it known that I, JOHN E. NORQUEST, a citizen of the United States, and residing at Richmond, in the county of Henrico and State of Virginia, have invented new and useful Improvements in Cigar and Cheroot Trimming Mechanism, of which the following is a specification.

This invention relates to certain novel and useful improvements in a trimming device, adapted to be employed in connection with cigar and cheroot making machines for the purpose of clipping one or both ends of the product.

In the present instance, I have by way of illustration, shown and described my invention as applicable to the trimming of cheroots where it is desirable to clip both ends of the article, but of course it will be evident that it may be adapted for analogous purposes, as for the trimming of a cigar, where but one end thereof is clipped.

Heretofore, in cheroot machines, the operation of cutting both ends of the cheroot has been accomplished by two pairs of trimming knives or shears, one pair being spaced from the other a sufficient distance to enable both ends of the product to be trimmed simultaneously. The individual knife members have each comprised a flat blade of steel, necessarily very thin, because the cutting edge of such blade has been formed integral with the body of the latter by concaving one edge of the blade, near the top thereof, and then grinding one wall of the recess, thus formed to a sharp cutting edge. Where a plurality of such blades have been used to constitute the cutter mechanism, certain disadvantages have been found to exist. For instance, owing to the thinness of the bodies of the blades, they rapidly wear under the stresses and strains incident to the operation of the machine, with the result that frequent readjustment and even replacement has been necessary. Furthermore, the cutting edges of these blades quickly wear down, making frequent regrinding and resharpening necessary, this requiring the removal of the blades from the machine and the consequent stoppage of the latter. It has also been found difficult to adjust these blades to proper cutting position to clearly cut or trim cheroots of varying sizes and thicknesses, without incurring the loss of time incident to stopping the machine and adjusting the cutters or bearings of the blades themselves, because as each blade has been formed of a single piece of metal, the cutting edges could not be adjusted to proper trimming relation to each other to open and close to the required degree and at the right time without making such adjustment from the mountings or bearings of the blades themselves, and the failure to make such proper relative adjustment has frequently resulted in causing mutilation or imperfect cutting of the ends of the cigars or cheroots instead of the clean, even sharp trimming desired.

With my invention, however, I have obviated the above-mentioned difficulties and disadvantages by making the cutting sections of the knives independent of the body portions of the blades themselves, and so mounting these cutting sections or knives that they may be adjusted independently of each other so as to enable both ends of the cheroot to be trimmed simultaneously and cleanly without tampering with or changing the bearings or cutters of the knives, when dealing with cheroots of varying thicknesses.

Furthermore, by my invention, I am enabled to make the shank or body of each knife of relatively thick metal, thus providing a strong, durable holder in which the relatively thin, sharp knife blade or cutter may be readily inserted and from which it may be easily removed, as for sharpening or replacement. Thus, I avoid the necessity of discarding the complete knife, shank and blade, when substitution is necessary, and I thereby save the loss of time and the consequent expense now commonly incurred in replacing cutting or trimming knives on cheroot or cigar machines.

With the above-recited objects, and others of a similar nature in view, my invention consists in the construction, combination, and arrangement of parts set forth and falling within the scope of the appended claims.

In the accompanying drawings:—

Figure 1:
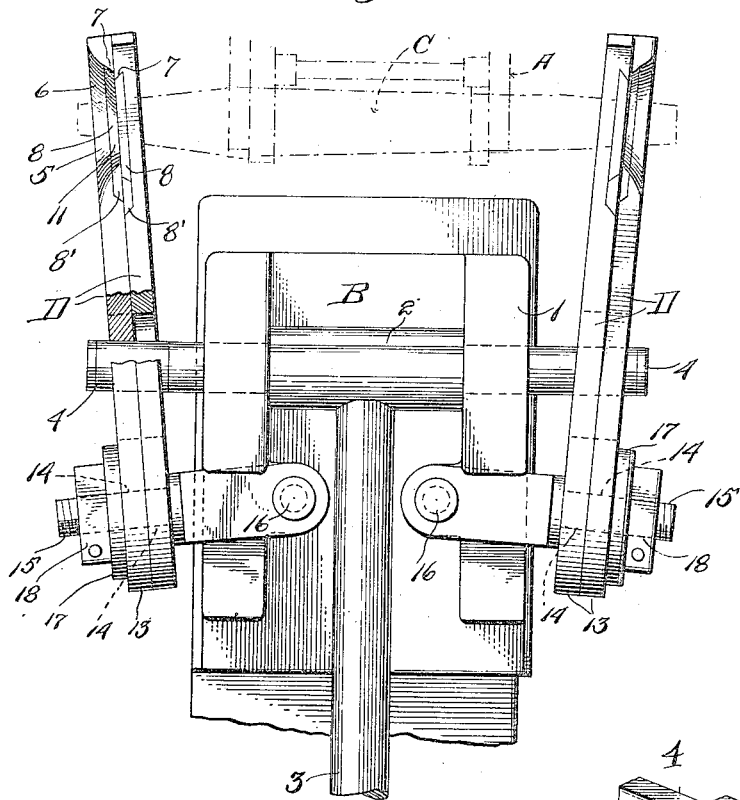
Figure 1 is a view in side elevation of a trimming mechanism embodying my invention, showing the same as employed for trimming cheroots.
Figure 3:
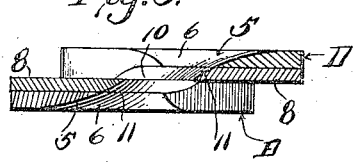
Fig. 3 is a cross-sectional view taken on the line 3—3 of Fig. 2.
Figure 4:
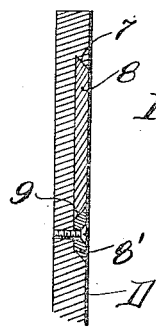
Fig. 4 is a vertical longitudinal sectional view taken on the line 4—4 of Fig. 2.

In machines of the character to which my invention is particularly adapted, it is understood that the cigar or cheroot is brought by the mechanism, known as the "bunch carrier" into position to enable an end or the ends of the article to be trimmed by the trimming knives, and in Fig. 1, I have conventionally illustrated a bunch carrier indicated by the letter A and carrying a cheroot shown at C.

Figure 2:
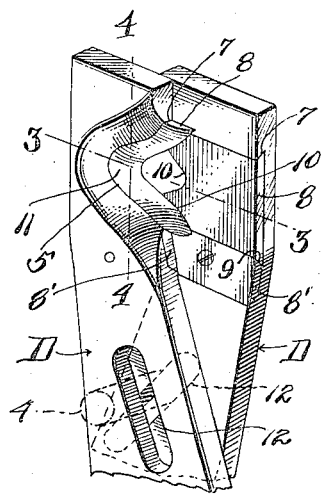
Fig. 2 is a perspective view of a pair of the knives and showing the cutter blades adjustably and removably mounted therein.

Such portion of the operating mechanism for the knives as is necessary to illustrate, is indicated as a whole by the letter B, and includes the usual supporting bracket 1, in which is mounted a horizontally disposed, vertically sliding shaft 2, operated through the arm 3, from any suitable power transmission device constituting a part of the machine. This shaft 2 is provided with the extension studs 4 at opposite ends thereof, which work the trimming knives to open and close the latter as hereinafter described. I employ two pairs of trimming knives as usual in machines of this character, these pairs being spaced apart sufficiently to receive and clip the ends of the cheroot. As the knives are all similar in construction and operation, a description of one will suffice. As will be more readily understood with reference to Fig. 2, each knife comprises a relatively thick, plate-like shank body portion, preferably of metal, having a concave section or recess 5, formed therein near the top, the outer face or wall of such recess being beveled as shown at 6. The inner face or wall thereof, or that opposite to the bevel, is undercut or dovetailed as shown at 7 to receive the removable and adjustable cutter or knife blade 8, the side edges of the latter being correspondingly dovetailed as at 9 to fit the dovetail of the shank, and the adjacent edge of the dovetailed securing gib 8'. The concaved shearing or cutting edge of the knife blade is indicated at 10, and this plate is beveled on one side as at 11 to correspond with the adjacent bevel of the shank of the knife. Furthermore, each shank D is provided with an elongated slot 12 for the reception of the adjacent stud 4 of the operating shaft 2, and as will be understood by reference to Figs. 1 and 2, when the two knives of each cutter are assembled in operative position, the slots of each pair of knife shanks will extend at an angle relative to each other and in lapping relation. The lower ends 13 of the shanks are formed with bores 14 for the passage of the pivots 15 and the pair of pivots are in turn pivoted at 16 to rock on the frame 1, a well-known form of coiled spring or spring washer 17 being employed on each pivot 15. The spring washers 17 are in the nature of ordinary friction washers and by tightening the nuts 18 enough friction can be produced by the washers to keep the knives from closing on the upward stroke of the arm or rod 3 until the knives are moved inward toward each other into a substantially vertical position, this being permitted of course by the pivots 15 moving upward on their pivot pins 16. When this inward movement of the knives ceases, due to the fact that the pivots 15 have reached the limit of their upward swinging movement, the cutting operation begins as the continued upward movement of the arm or rod 3 will cause the studs 4 working in the slots of the knives to close such knives against or in spite of the tension or friction action of the washers 17. After the end or ends of the cigar or cheroot has or have been cut off, these friction or spring washers 17 will also keep the knives from opening on the downward stroke of the arm or rod 3 until the knives have been brought or dropped back away from the ends of the cheroot or cigar and then the opening operation of the knives will begin. Because, as will be understood, the initial or first part of the downward movement of the rod or arm 3 will tend to pull or drop the pivots 15 downward into normal position, this of course being aided by the action of gravity, and after the pivots 15 have resumed such dropped position the continued downward movement of the rod or arm 3 will cause the extension studs 4 to pull the knives open against the action of the spring or friction washers 17. Of course the bunch carrier will bring the cheroots or cigars into position to be trimmed or cut by the knives, as will be understood by reference to Fig. 1.

When it is desired to adjust one knife blade relative to the others, it is only necessary to loosen the gib holding the same, and shift the blade to the desired extent, or in some cases, the adjustment may be made by simply tapping the back edge of the blade. The knives may be, of course, readily removed and inserted without affecting the mountings of the shanks or removing the latter from the machine.

While I have herein shown and described one embodiment of my invention, I wish it to be understood that I do not confine myself to all the precise details of construction herein set forth by way of illustration, as modification and variation may be made without departing from the spirit of the invention or exceeding the scope of the appended claims.

I claim:

1. A trimming mechanism of the class described, comprising a plurality of pairs of trimming knives, each knife including a shank or body portion having a recess formed near one end thereof, the wall of said recess being beveled and undercut, and a concaved beveled cutting blade seated in the undercut of the wall of the recess with the bevel of said blade conforming to the bevel of the recess wall.

2. A trimming mechanism of the class described comprising two spaced pairs of trimming knives, each knife comprising a relatively thick shank or body portion, and a relatively thin cutting blade removably and detachably seated in the shank, said blade having a concaved beveled cutting edge, the cutting edges of the blades of each pair of knives being arranged in opposition to each other.

3. In a trimming mechanism for cheroots and the like, the combination with a frame, of two pairs of trimming knives pivotally mounted on pivots on said frame, in spaced relation to each other, each knife comprising a relatively thick slotted shank section, and a relatively thin cutting blade removably and adjustably mounted adjacent the top of the shank section, and means for rocking the pivots of the knives to move the two pairs toward each other and for closing the knives of each pair to clip the ends of the cheroots, said means also acting to open the knives and move the latter away from each other to release the trimmed cheroot.

In testimony whereof I have hereunto set my hand.

JOHN E. NORQUEST.

Copies of this patent may be obtained for five cents each, by addressing the "Commissioner of Patents, Washington, D. C."